US006284291B1

United States Patent
Siecke et al.

(10) Patent No.: US 6,284,291 B1
(45) Date of Patent: Sep. 4, 2001

(54) METHOD AND APPARATUS FOR CONTINUOUSLY FORMING CENTER-FILLED GUM

(75) Inventors: Albert Siecke, Lanoka Harbor, NJ (US); Jose Marcilio, Sao Paulo (BR)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 09/512,502

(22) Filed: Feb. 24, 2000

Related U.S. Application Data (60) Provisional application No. 60/147,898, filed on Aug. 9, 1999.

(51) Int. Cl.[7] ............... A23G 3/00; A23P 1/00; B28B 5/00
(52) U.S. Cl. ............... 426/5; 425/233; 425/235; 425/345; 426/512; 426/524
(58) Field of Search ............... 426/3, 4, 5, 512, 426/516, 524, 660, 414; 425/233, 235, 237, 345

(56) References Cited

U.S. PATENT DOCUMENTS

| | | | |
|---|---|---|---|
| 3,857,963 | 12/1974 | Graff et al. | 426/5 |
| 4,543,769 | 10/1985 | Schmitz | 426/5 |
| 5,667,824 | * 9/1997 | Ream et al. | 426/5 |
| 5,756,133 | * 5/1998 | Duggan et al. | 426/524 |
| 5,971,739 | 10/1999 | Hoffman et al. | 425/337 |

* cited by examiner

Primary Examiner—George C. Yeung (57) ABSTRACT

Mechanisms and system for continuously producing pieces of liquid-filled gum. A rope of gum produced by an extrusion machine is cooled, sized, and separated into individual pieces of gum. A rotating drum mechanism and continuous chain mechanism having mating die groove members separate the rope of gum material into individual pieces and form the pieces into their final size and shape. Pairs of cam-operated plunger members positioned in the rotating drum mechanism compress and form the pieces of gum material in the dies. Cooling air supplied by tubular members positioned adjacent the drum mechanism and chain mechanism keep the gum material in a cooled condition for ease of processing. Features assisting the separation of the formed pieces of gum material from the operating machinery include regulation of balanced cooling, blasts of cooling air, and releasable die groove members.

21 Claims, 9 Drawing Sheets

METHOD AND APPARATUS FOR CONTINUOUSLY FORMING CENTER-FILLED GUM

CROSS-REFERENCE TO RELATED APPLICATIONS

This application is based on the contents of Provisional Application Ser. No. 60/147,898, filed on Aug. 9, 1999, the priority from which is claimed herein.

TECHNICAL FIELD

A system for continuously forming center-filled gum, particularly for continuously forming individual sealed pieces of liquid-filled gum from a continuous rope or strand.

BACKGROUND OF THE INVENTION

Liquid or center filled gum and other confectionery products are in popular demand today. These products have a hard or solid exterior shell and a soft or liquid center. The outer shell portion can be chewing gum or bubble gum of some type, while the liquid center portion can be a flavored material typically having a syrup-like consistency.

There are numerous mechanisms and systems known today for forming liquid-filled gum and other confectionery products. One of these systems is shown, for example, in U.S. Pat. No. 3,857,963 to Graff et al. Although many of these known mechanisms and processes operate satisfactorily and produce acceptable results, there are a number of mechanical and processing concerns which need improvement. In particular, there is a need for faster, high volume systems as well as systems which are more efficient, easier to operate, and have fewer mechanical breakdowns.

One of the difficulties in the art of gum manufacturing is the fact that the gum products are tacky and have a tendency to stick or adhere to molds and operating machinery. Thus, it is recognized that gum producing mechanisms need to be operated at low temperatures, such as minus one hundred degrees Fahrenheit ($-100°$ F.). At these low temperatures, however, the costs of operation increase and the operation of machinery becomes more difficult. For example, oils and greases can congeal into non-fluid masses, thereby reducing the lubricating ability of the materials and causing increased friction of moving parts. This also causes additional heat load on the moving parts resulting in less efficient high speed operation.

It is also necessary with some known low-temperature gum forming operations to cool virtually the entire machinery, including all of the rotating parts. This is particularly true with systems which utilize rotating piece-producing drum members wherein the products are in contact with the drum members virtually the entire circumference of the drum. Cooling in these systems is typically done with liquid nitrogen in order to provide the necessary low temperatures. Cooling all parts of the apparatus with liquid nitrogen, however, creates significant additional expense, as well as further mechanical and friction difficulties in the operation of the machinery.

SUMMARY OF THE INVENTION

It is an object of the present invention to provide an improved mechanism and system for producing center-filled gum products. It is also an object of the present invention to provide an improved system for continuously producing pieces of center-filled gum from a continuous rope or strand of gum material.

It is a further object of the present invention to provide a continuous gum manufacturing mechanism and system in which the necessity to cool all of the various components is lessened and it is also unnecessary to provide cooling to the degree required in the prior art. It is still another object of the present invention to provide an improved gum manufacturing mechanism and system which produces center-filled gum products on a faster and more efficient basis and wherein heat build-up and frictional forces are lessened.

These and other objects are met by the unique and inventive gum forming mechanism and system in accordance with the present invention. The system includes an extrusion and gum forming mechanism with a rotating drum and continuous chain member which produces center-filled gum pieces on a faster, more efficient and less costly basis.

The gum forming mechanism includes a sizing and transport table which conveys the rope of gum material to the rotating drum and continuous chain section. The rotating drum mechanism and continuous chain mechanism work together in combination, each having semi-circular die groove members which together form a circular (cylindrical) die which separates, shapes, and forms the gum pieces. A series of cam-operated plunger members are positioned in the drum mechanism on opposite sides of the cylindrical die groove members in order to help shape and form the individual pieces of gum. The pieces of gum are formed along only a relatively short portion of the continuous chain mechanism and rotating drum mechanism, thus reducing the cooling requirements of the system. This also reduces heat build-up, friction losses, and the tendency of lubricating materials to congeal.

The axial movement of the plunger members is also limited, thus reducing possible frictional forces. The limited contact of the gum with the moving members also minimizes the opportunities of the gum pieces to stick to the machine members.

Tubular cooling members are positioned around the rotating drum mechanism and adjacent to the continuous chain mechanism in order to provide cooling air as needed. A stream of air is also utilized to help discharge formed gum pieces from the die groove members. The semi-circular die groove members on the chain member open up or expand to allow easier removal of the formed gum pieces.

With the present invention, less cooling is necessary and only cooling air is needed; the use of expensive nitrogen gas is unnecessary. The cooling also can be regulated or balanced in order to reduce the tendency for the formed gum pieces to be retained on the rotating drum mechanism. As a result, with the present invention, liquid-filled pieces of gum are formed in a faster and more efficient manner than with known processes and systems.

BEST MODE(S) FOR CARRYING OUT THE INVENTION

Figure 1:
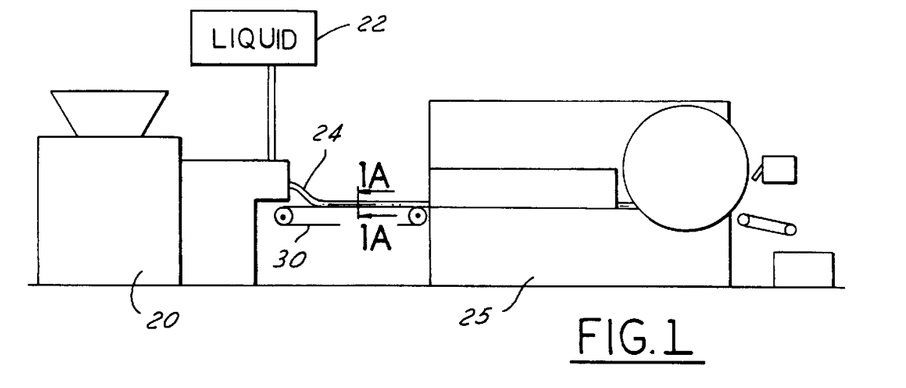
FIG. 1 schematically illustrates a continuous center-filled gum forming system in accordance with the present invention.

FIG. 1 shows an extrusion machine 20 and a gum forming mechanism 25. The extrusion machine 20 can be of any conventional type and includes a liquid filling mechanism 22. The liquid filling mechanism is utilized to insert a stream of liquid material in the center of the gum 24 as it is being formed and extruded by the extrusion machine. Mechanisms to center-fill gum and other confectionary products are known in the art and no further description is required here.

Figure 1A:
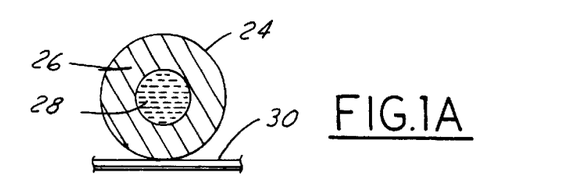
FIG. 1A is a cross-sectional view of the center-filled gum material shown in FIG. 1, the cross-section being taken along lines 1A—1A thereof.

As shown in FIG. 1A, the gum material 24 is extruded in a continuous rope or strand having a generally circular cross-section. The gum material 24 includes an outer core or shell 26 of chewing gum or bubble gum material and an inner core 28 of a liquid or softer material. In this regard, centers of liquid filled gum products are flavored and typically have a liquid or a syrup-like consistency.

The rope of gum material 24 is conveyed to the gum forming mechanism 25 in any standard manner, such as by conveyor 30. Also, it is preferred that the extrusion machine 20 be positioned adjacent to the gum forming machine 25 as shown, although it can be located at a substantial distance therefrom if necessary (e.g. due to space considerations).

Figure 2:
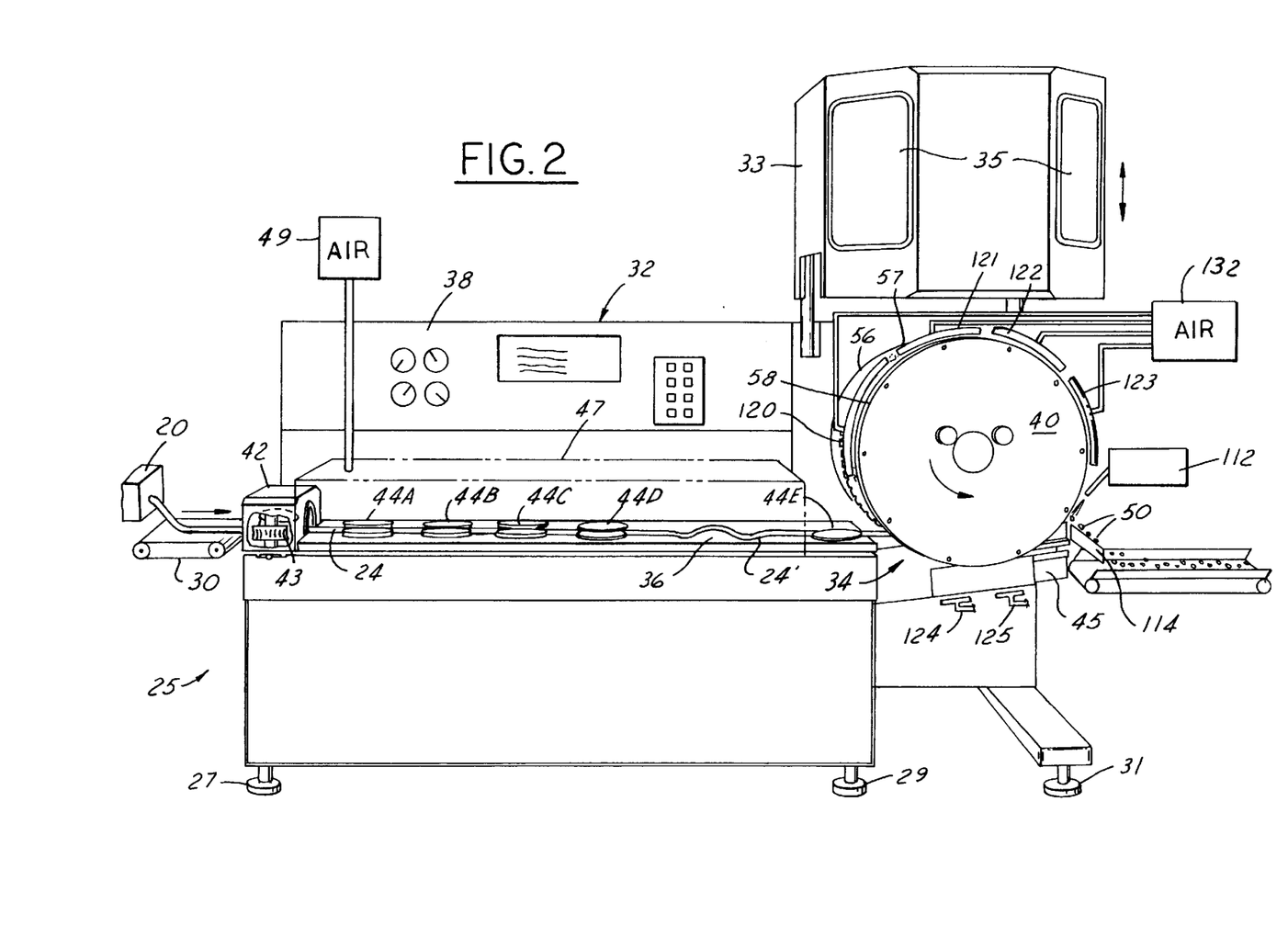
FIG. 2 depicts a gum forming mechanism in accordance with the present invention.

As shown in FIG. 2, the gum forming machine 25 comprises a gum transport section 32, together with a piece-forming section 34 consisting of a rotating drum mechanism 40 and a continuous chain mechanism 45 which continuously form pieces of liquid-filled gum 50.

The gum transport section includes a table member 36 and a control panel 38. The table member 36 has a feeding mechanism 42 positioned at one end and a series of roller members 44A, 44B, 44C, 44D, and 44E positioned along the surface of the table. The rope of gum material 24 is pulled onto the table 36 by powered rotating roller members 43 positioned in the feeding mechanism 42. The sets or pairs of roller members 44A, 44B, 44C, and 44D assist in transporting the gum rope 24 along the top of the table member 36. The final set of roller members 44E at the end of section 32 are used to guide the rope of gum material into the gum individual piece forming section 34.

As shown in FIG. 2, the rope of gum material is preferably not stretched tightly along the top of the table member 36. Instead, the rope of gum material is conveyed along the transport section 32 at a consistent speed and has a slackened section 24' prior to entering the piece forming section 34.

Preferably, the transport section 32 is kept at a reduced temperature in order to prevent the gum material from sticking to the roller members. For this purpose, a housing member 47 (a/k/a "cooling tunnel") is preferably positioned over the table member 36 and cooled air is directed toward the roller members from a source of cooled air 49. The temperature along the table member 36 inside the housing member 47 is typically in the range from −90° F. to −100° F.

The gum forming mechanism 25 is positioned on a series of supports and/or leg members, such as members 27, 29, and 31, and also includes a cover or housing member 33 which is adapted to slide over and enclose the rotating drum mechanism 40 and continuous chain mechanism 45. The housing member 33 acts as a cooling chamber to keep the gum material 24 and operating mechanisms 40 and 45 at a low and consistent temperature. Windows 35 in the cover member 33 can be provided to allow the operator to visually inspect the piece forming operation.

FIGS. 4–8 illustrate the rotating drum mechanism 40 in more detail and illustrate its operation. The drum mechanism 40 has a circular shape and is positioned on a fixed shaft 54 which is positioned in socket 51 in mechanism 25. Shaft 54 has a central axis 52. Socket 51 has an outer flanged member 51A.

The drum mechanism 40 has basically two sections, a first hollow circular drum member 56 and a second hollow circular drum member 58. The first drum member 56 is fixedly attached to the housing of the gum forming mechanism 25, while the second drum member 56 is attached through web supporting member 60 to hub sleeve member 61 which is rotationally positioned on the shaft 54. The sleeve member 61 and in turn the second drum member 58 are rotational around shaft 54 by gear member 59 which is connected to a motor (not shown) in the mechanism 25. The gear member 59 meshes with gear teeth 63 positioned on the web supporting member 60.

An annular gap 57 is formed between the two drum members 56 and 58. A plurality of die groove members 62 are positioned around the circumference or periphery of the web supporting member 60 and rotate with it. The die members 62 are positioned in the annular gap 57. The die members 62 are positioned and dimensioned to mate with corresponding semi-circular die groove members 64 formed in the continuous chain mechanism 45, as discussed in more detail below.

A plurality of sets of plunger members 66 and 68 are also connected to the web supporting member 60 and the rotating drum member 58. In the preferred embodiment, eighty-six (86) pairs of plungers are provided. The plunger members 66, 68 have shaft members 66A and 68A and head members 70 and 71, respectively. The shaft members 66A, 68A are positioned in openings in support members 73A, 73B and 75A, 75B, respectively, in the web member 60.

Figure 4:
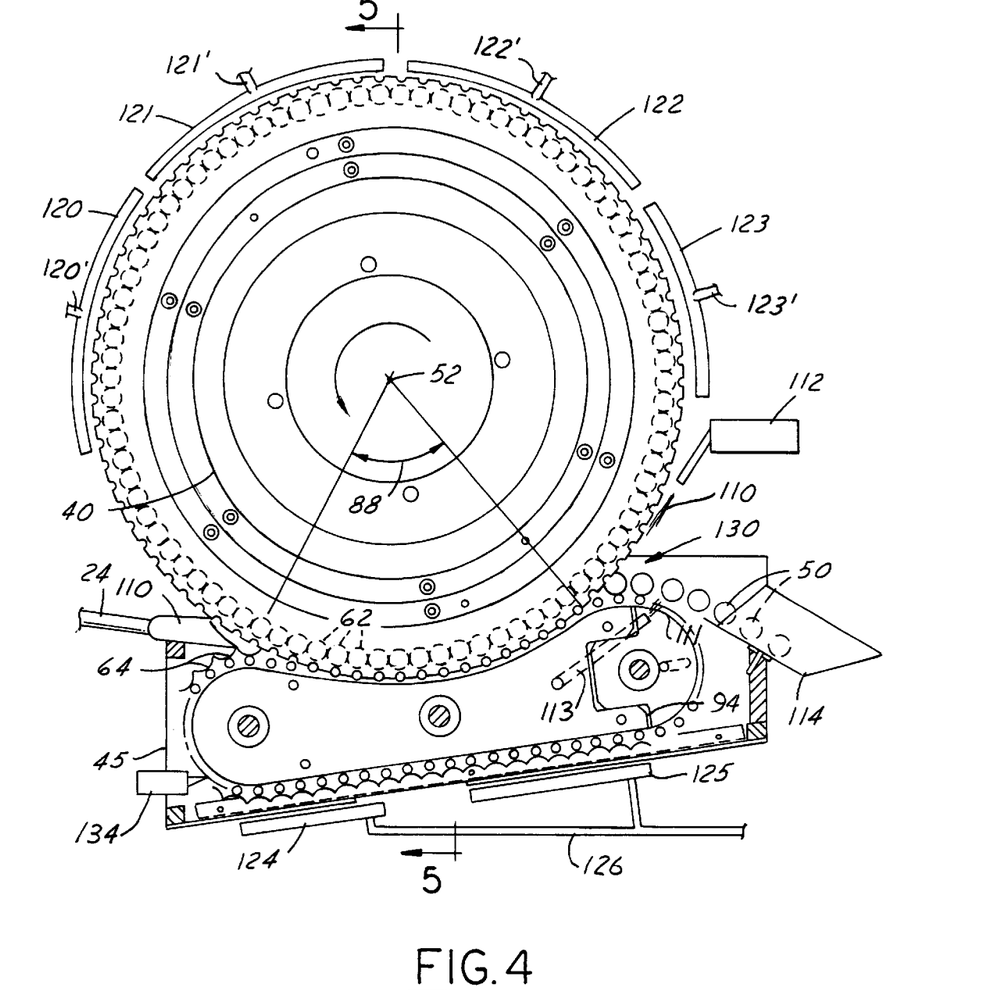
FIG. 4 illustrates another portion of the gum forming mechanism in accordance with the present invention.
Figure 5:
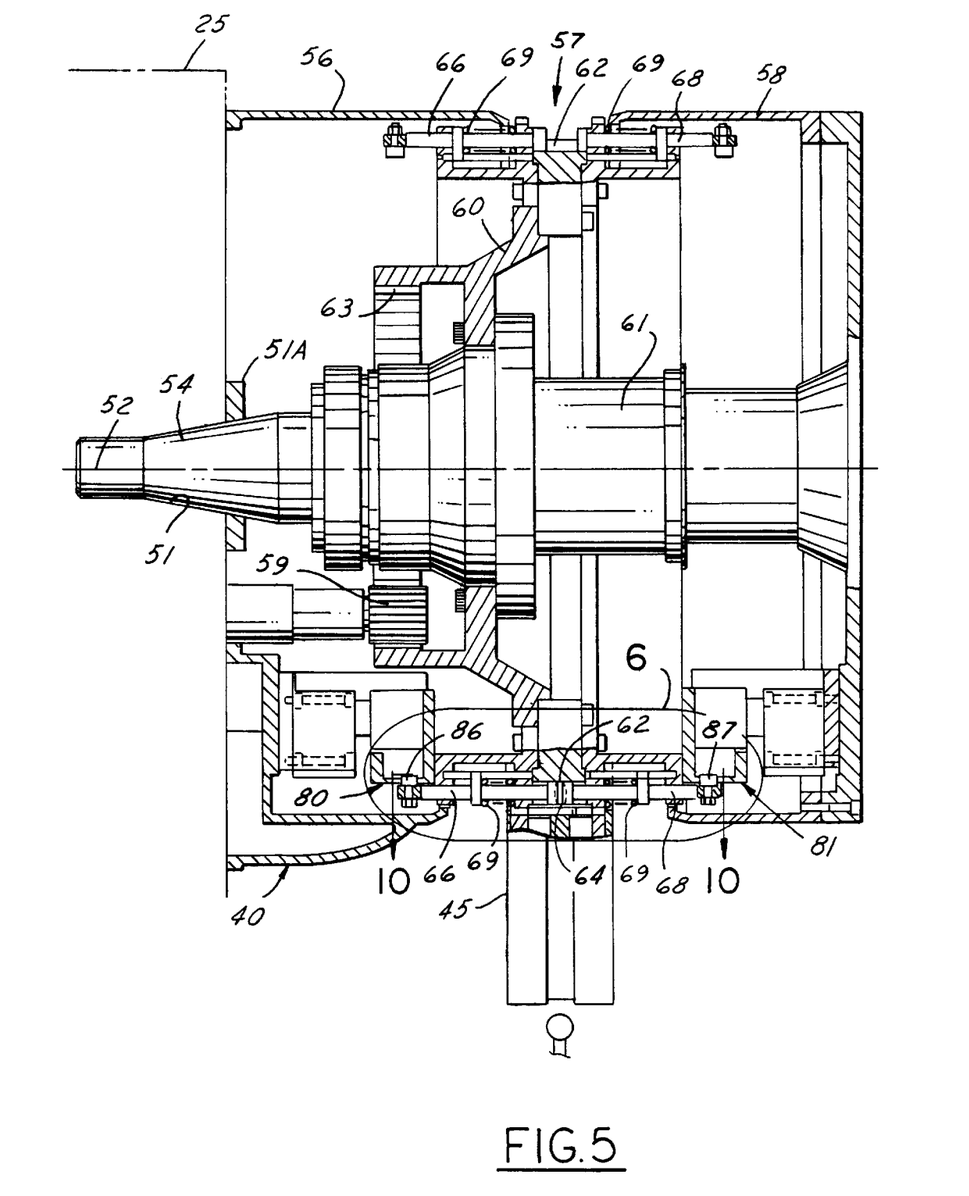
FIG. 5 is a cross-sectional view of the gum forming mechanism shown in FIG. 4, the cross-section being taken along line 5—5 thereof.
Figure 6:
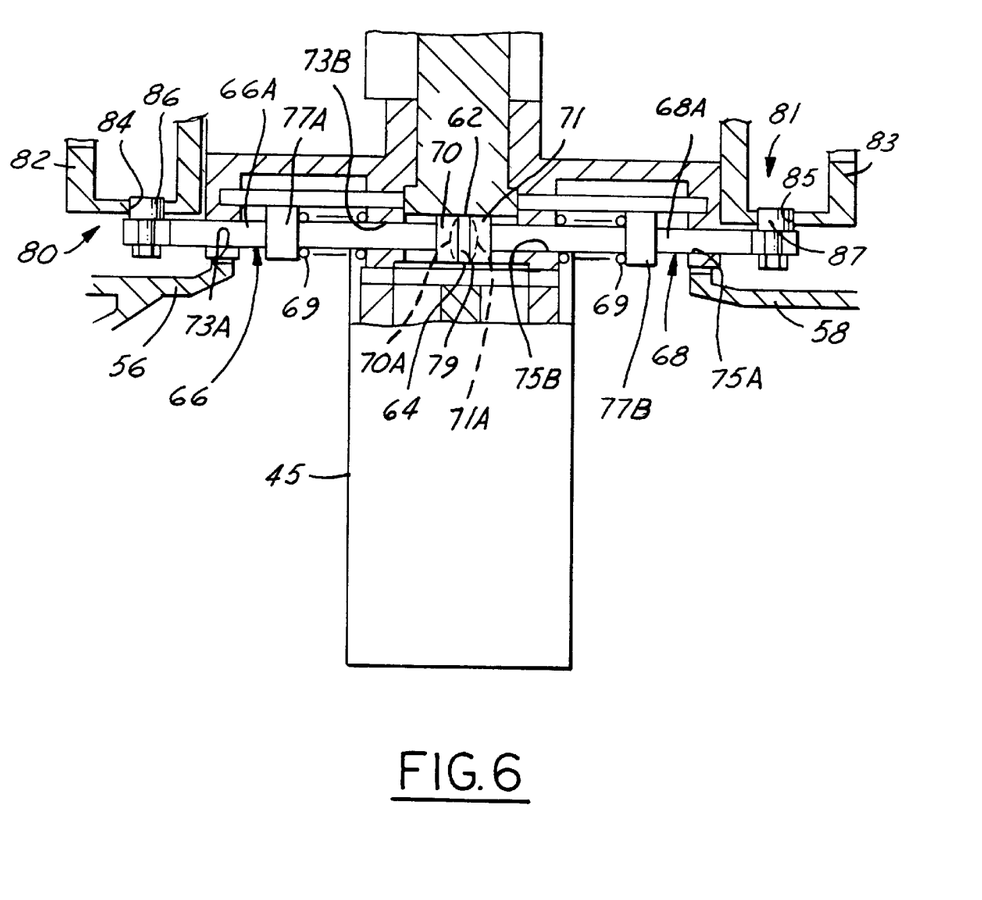
FIG. 6 is an enlarged view of a portion of the cross-section shown in FIG. 5, the portion being designated by the numeral 6 in FIG. 5.
Figure 7:
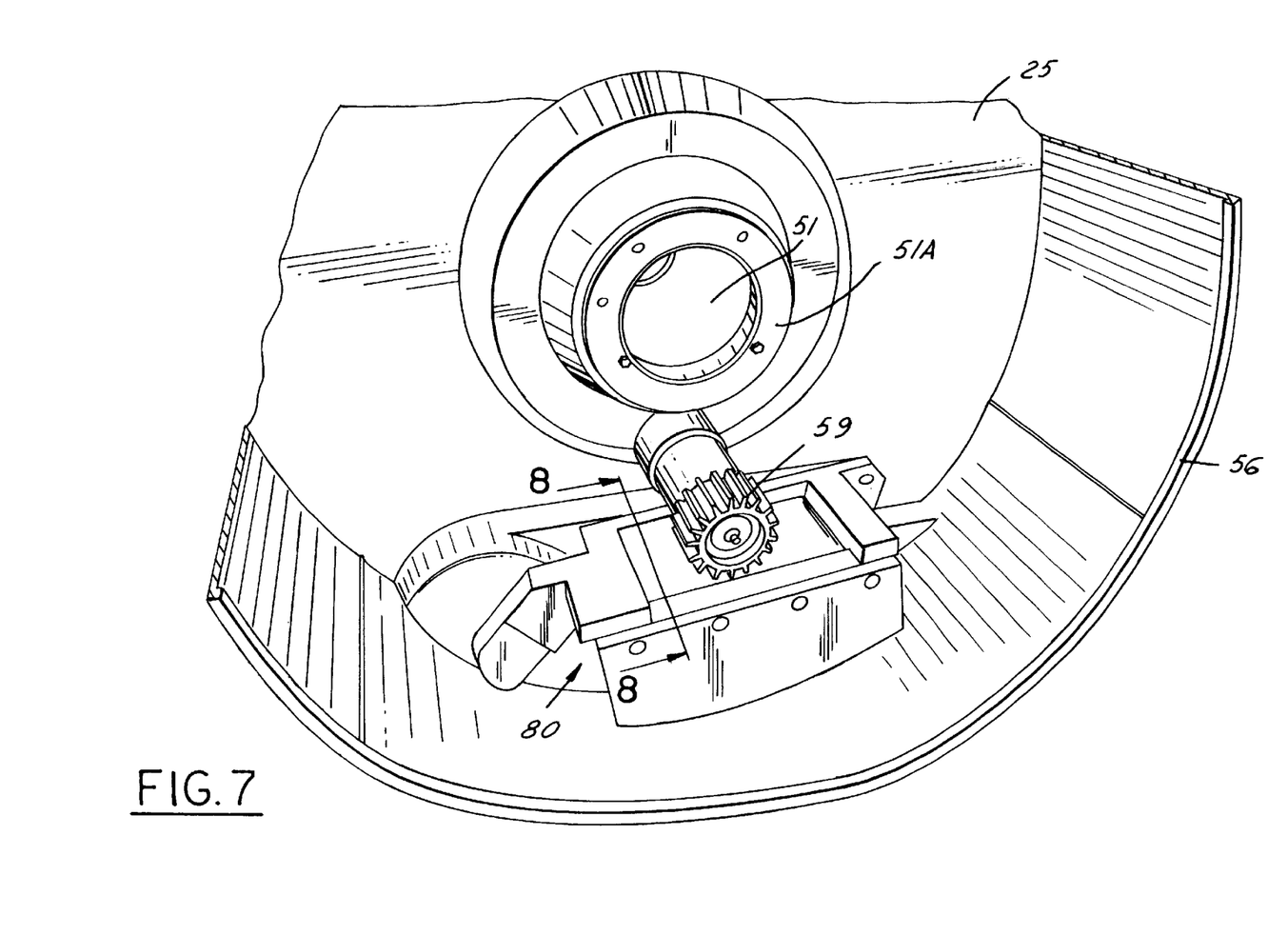
FIGS. 7 and 8 illustrate other portions of the gum forming mechanism in accordance with the present invention, including the cam grooves.

As shown in FIGS. 4–6, the plurality of semi-circular die groove members 62 are positioned around the circumference or periphery of the rotating drum 40. The same number of die groove members 64 are provided that correspond to the number of sets or pairs of plunger members 66, 68 which are provided around the circumference of the rotating drum mechanism 40. Each die groove member 62 has a pair of plunger members associated with it, one on each side thereof and in axial alignment with it (and thus with each other).

The plunger members 66, 68 are normally biased to their retracted positions, such as shown in the upper half of FIG. 5. The biasing forces are supplied by spring members 69, although other equivalent biasing mechanisms could be utilized. As shown in FIG. 6, the spring members 69 are positioned between support members 73B and slide block members 77A attached to shaft members 66A and between support members 75B and slide block members 77B attached to shaft member 68A.

Figure 10:
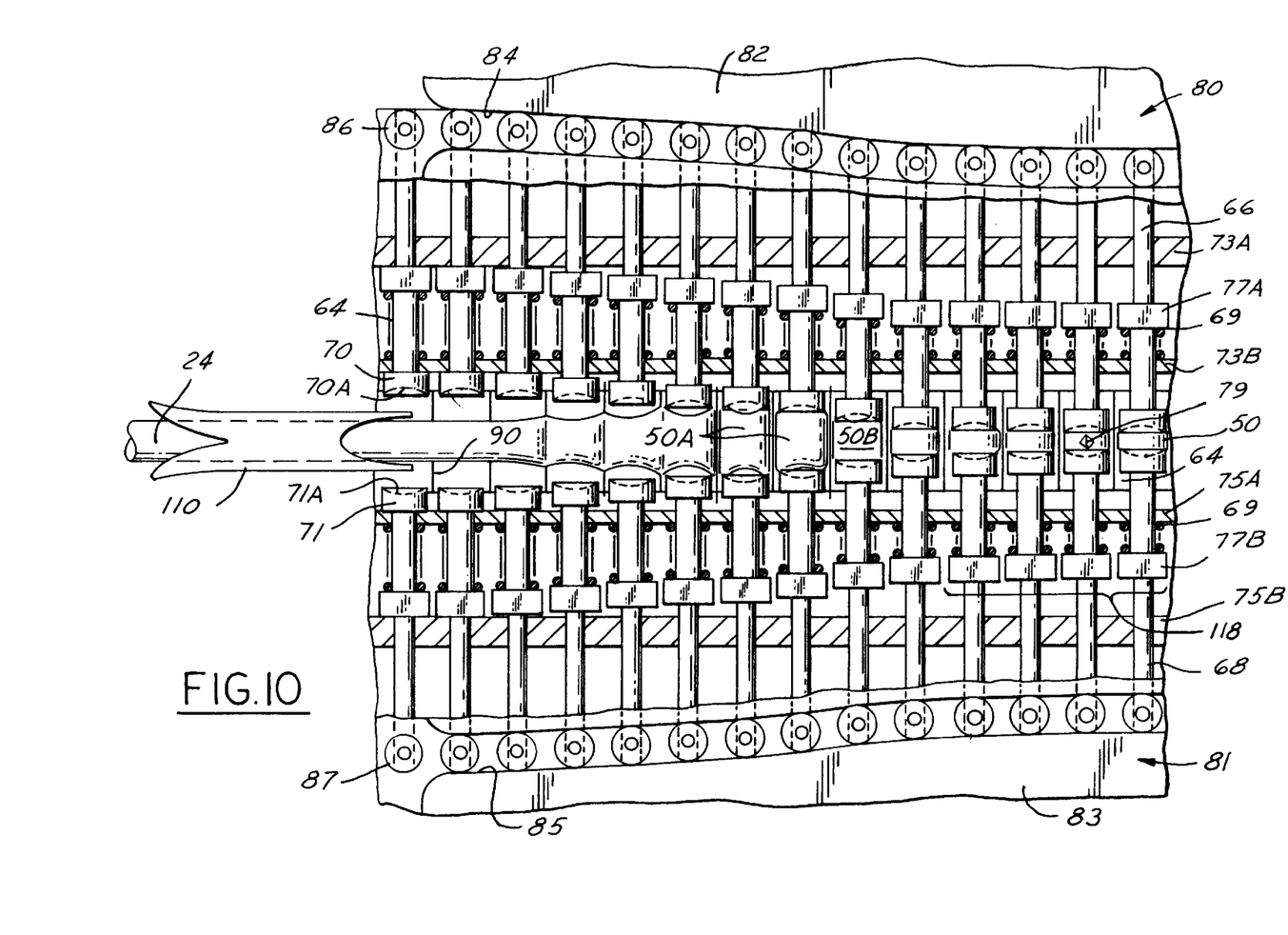
Figure 11:
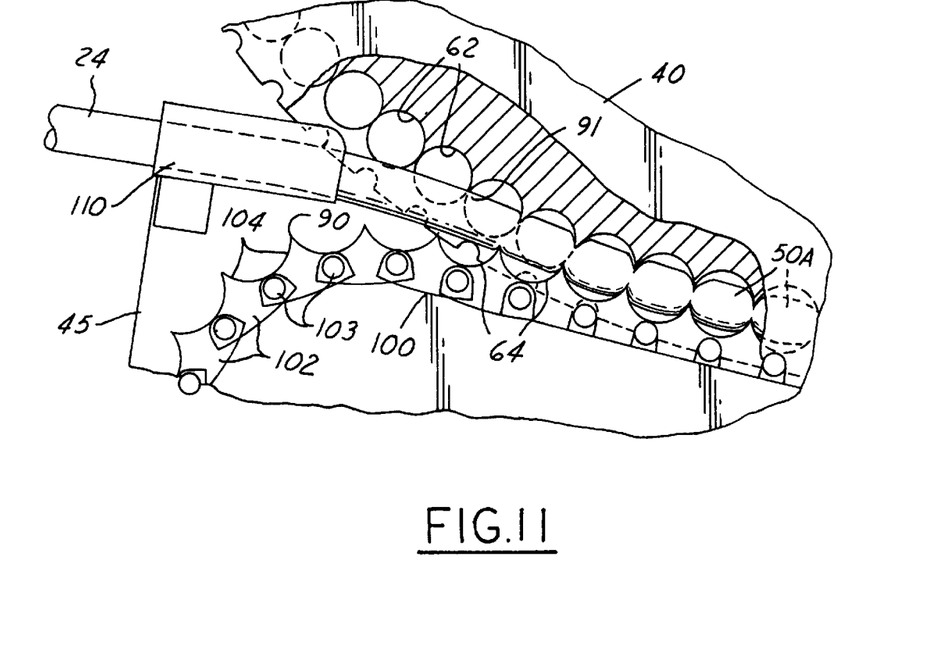
Figure 12:
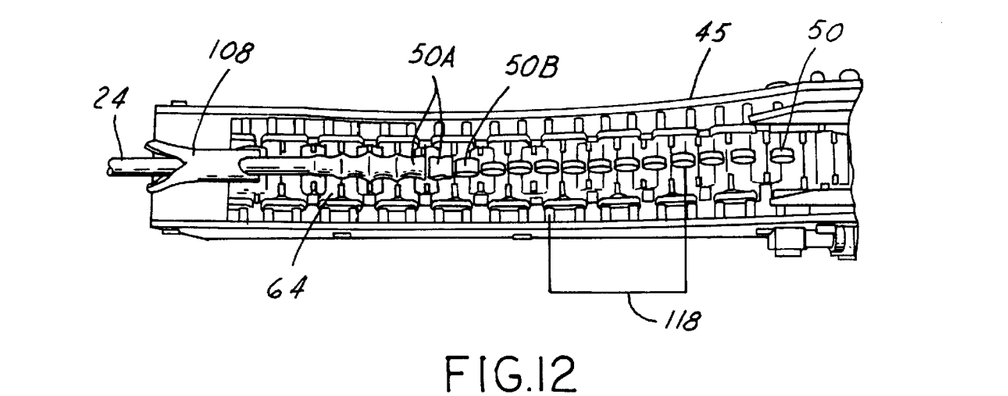

Plunger members 66 and 68, in turn, are activated by cam mechanisms 80 and 81 (as better shown in FIGS. 6, 8, and 10) to their closed piece-forming positions, as shown in the lower half of FIG. 5. When the plunger members are in their closed positions, a small gap 79 is left between the head members 70, 71, the gap being the same as the final desired width of the pieces of formed gum. The diameter of the head members 70, 71 of the plunger members 66, 68 are sized to fit precisely within the circular cylindrical cavities formed by the two semi-circular die groove members 62 and 64. Also, as shown in FIG. 6, the faces 70A and 71A of the head members are preferably concave in shape in order to form rounded sides on the final formed pieces of gum material 50. It is to be understood, of course, that the faces 70A and 71A can have any shape and can include, if desired, a product or company name or logo which then becomes imprinted on the sides of the pieces of gum 50.

The cam mechanisms 80, 81 have supporting members 82 and 83, respectively, which in turn have curved cam slots 84 and 85, respectively. The cam supporting mechanisms 82, 83 are fixed relative to the mechanism housing 25 and do not rotate. Cam follower members 86 and 87 are secured on the ends of the plunger members 66 and 68, respectively, and are positioned to fit within, and be activated by, the curved cam slots 84 and 85.

The cam mechanisms 80, 81 move the plunger members from their retracted positions to their closed positions. The cam members are positioned only along the lower arcuate area 88 of the drum mechanism 40, as shown in FIG. 4. The plunger members thus only come into contact with, and are operated by, the cam mechanisms within the area 88. For the remainder of the rotation of the drum mechanism, the plunger members are in their fully retracted positions.

When the drum member 58 is rotated around shaft member 54, the cam follower (roller) members 86, 87 enter the cam slots 84, 85 during the period that the plunger members 66, 68 are positioned within the arcuate area 88. The curved slots 84, 85 operate the plunger members and move them from their retracted to closed positions (preferably in the manner shown in FIG. 10).

The continuous chain mechanism 45 is shown in more detail in FIGS. 4, 9, 11 and 12. The chain mechanism 45 includes an endless chain member 100 which has a series of link members 102 connected together by pivot pins 103. Each of the link members 102 has a pair of arcuate-shaped surfaces 104. One of the arcuate-shaped surfaces on each link member mates with a corresponding arcuate-shaped surface on an adjacent link member to form die groove members 64. Thus, when the link members are in general horizontal alignment, as shown on the top and bottom portions of the chain mechanism 45 in FIGS. 4, 9 and 11, two adjacent arcuate-shaped surfaces 104 form each of the semi-circular die groove members 64. When the link members 102 are traveling around the curved ends 108 and 109 of the chain mechanism, the die groove members 64 "open up" as the links 102 separate from each other around pivot pins 103.

The rotating drum mechanism 40 and the continuous chain mechanism 45 are positioned such that pairs of the semi-circular die groove members 62 and 64 come together to form cylindrically shaped die cavities 65 along a certain portion of the travel of the gum material (within area 88). The die cavities 65 shape and form the individual pieces of gum material 50.

Preferably, the outer ends or "tips" 90 and 91 of the semi-circular die members, 64 and 62, respectively, meet or make contact in order to provide an effective mechanism for cutting and separating the rope of gum material 24 into individual pieces. Also, preferably the ends 90 and 91 are chamfered in order to provide a minimal or thin line contact between the die members for ease of cutting the gum material.

A tensioning mechanism 94 is also provided as part of the chain mechanism 45 in order to provide appropriate tension in the chain member 100 so that the die cavities 65 are formed efficiently and precisely. The tensioning mechanism 94 can be of any conventional type used to tension endless chain or belt mechanisms and can be adjustable so that the tension in the chain member 100 can be adjusted as desired.

Figure 3:
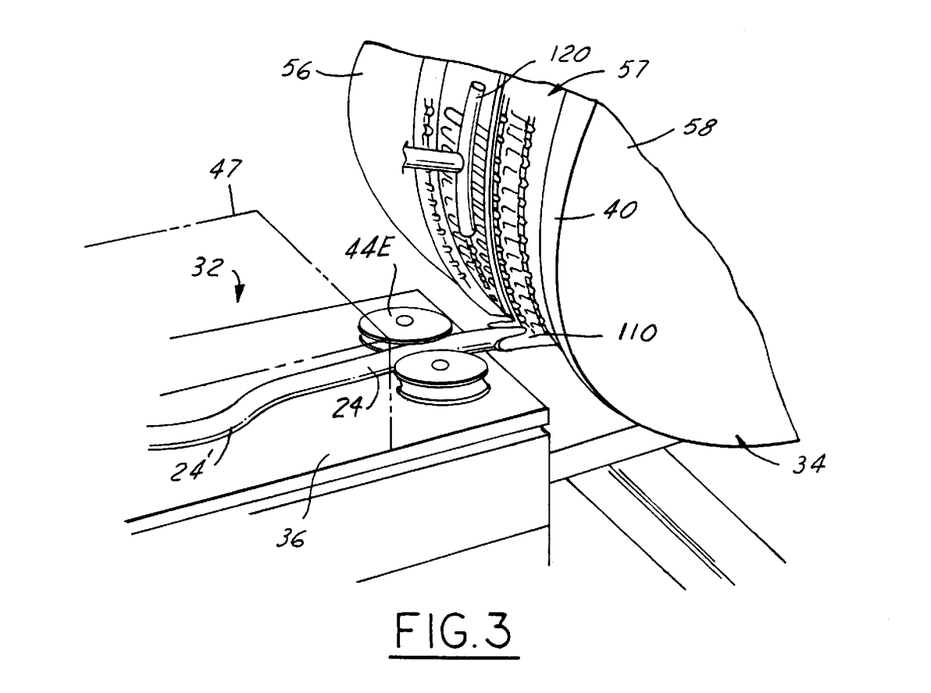
FIG. 3 is an enlarged view up of a portion of the gum forming mechanism in accordance with the present invention.

As shown in FIGS. 9–12, the rope of gum material 24 is threaded through a chute member 110 and passed into the intersection between the drum mechanism 40 and chain mechanism 45. (This is also shown in FIG. 3.) Thereafter, as the two semi-circular die groove members 62 and 64 approach and mate together, pillow members 50A are initially formed and then the pillow members 50B are separated from each other. At this point, the cam mechanisms 80 and 81 actuate the plunger members 66 and 68 and move the plunger members longitudinally toward their fully closed positions, compressing the individual pieces of gum material into their final shape and form 50 (small cylindrically-shaped disks). In this regard, several of the sets of plunger members are held in their closed positions approximately along area 118 of the chain mechanism in order to retain the pieces of gum material in the compressed stages, thereby "setting" the formed pieces of gum material 50 into their final shapes. In this regard, a combination of the pressure from the plunger members and the cooled temperatures caused by the circulation of cooling air (as explained below), sets and retains the pieces of gum material 50 in their final shapes.

The pieces of gum material 50 are conveyed by the chain mechanism 45 past the point where the rotating drum mechanism and chain mechanism separate. This is shown in particular in FIGS. 4 and 9 and indicated by the reference numeral 130. At this point, the arcuate-shaped surface 104 of adjacent link members 102 separate or "open up" the die groove members 64. This assists in the release of the pieces of gum material 50 from the chain member 100. In addition, a high pressure stream or jet of cooled air 110 from nozzle 112 aids in removal of any pieces of gum material 50 which might stick to the die groove members 62 in the rotating drum mechanism 40 as they proceed past the separation area 130. The individual pieces of gum material 50 are then dropped into a chute member 114 or other container and conveyed for further processing and packaging.

It is also possible to provide a jet or stream of cooled air 111 from nozzle 113 positioned inside the chain mechanism 45 and directed to the release area for the pieces of gum material 50. This is shown in phantom lines in FIG. 4. The air jet 111 could be provided from the same system which provides the air stream 110.

In accordance with the present invention, a series of arcuate tubular members 120, 121, 122, and 123 are positioned around the upper portion of the rotating drum mechanism 40 (see FIGS. 2–4). The tubular members 120–123 each have a plurality of small openings in them facing the die groove members 62. Cooled air is circulated through the tubular members 120–123 from conduits 120', 121', 122', and 123', respectively, and directed toward the die grooves to retain them in a cooled condition. The openings in the cooling tubes are spaced approximately 5–10 mm from the tips 91 of the die groove members 62, and preferably about 7 mm.

In addition, tubular cooling members 124 and 125 are positioned adjacent the continuous chain mechanism 45 in order to provide cooling air to that mechanism. Series of small openings in the tubular members 124 and 125 similarly allow cooling air to be directed toward the semi-circular die groove members 64 in order to cool them. Cooled air is supplied to the cooling members 124 and 125 through conduit 126.

Cooled air is generated and supplied to the tubular members 120–123 and 124–125 in any conventional manner, such as by a compressor 132. Preferably, the air is supplied at temperatures in the range from –80° F. to –100° F. Temperatures in these ranges can be supplied by conventional two-stage refrigerated compressed air mechanisms. The use of liquid nitrogen is not necessary, although nitrogen could be utilized if desired. Also, the air is typically supplied at pressures of about 4–8 atmospheres (preferably 6 atmospheres) and at a rate of approximately 200–250 cubic feet per minute.

With the present invention, it is only necessary to cool a small portion of the die grooves of the rotating drum mechanism to prevent possible sticking of the gum material. In particular, as shown in FIG. 4, this consists of sector or area 88. This is the only portion in which the die groove members and plunger members come into contact with the gum material. As a result, the present invention can be cooled sufficiently through the use of cooled air rather than more costly liquid nitrogen.

Also, the cooling air is regulated with respect to the amount of cooling provided on the two sets of die groove members 62 and 64. Preferably, the chain mechanism is kept slightly higher in temperature (10°–20°F.) than the rotating drum mechanism such that the formed pieces of gum material 50 will have a tendency to remain on the chain mechanism as opposed to the rotating drum mechanism when the two mechanisms separate. (The separation is indicated by reference numeral 130 in FIGS. 4 and 9.) The temperature is increased by reducing the amount of air flow. This prevents pieces of formed gum material 50 from sticking to the rotating drum mechanism 40 as it proceeds past the separation point 130 and from traveling around the perimeter of the drum mechanism and interfering with the formation of additional gum pieces in subsequent rotations of the drum mechanism.

Also, it is possible to assist in retaining the formed pieces of gum in the groove members 64 in the chain mechanism rather than the groove members 62 in the drum mechanism by providing the groove members 64 with a rougher or more abrasive surface than groove members 62.

Preferably, the die groove members 62 and 64 are each approximately 180°, or one-half the cross-sectional circular shaped die-forming cavity 65. This allows the formed pieces of gum material 50 to be ejected more easily when the two mechanisms separate.

Figures 8, 9:
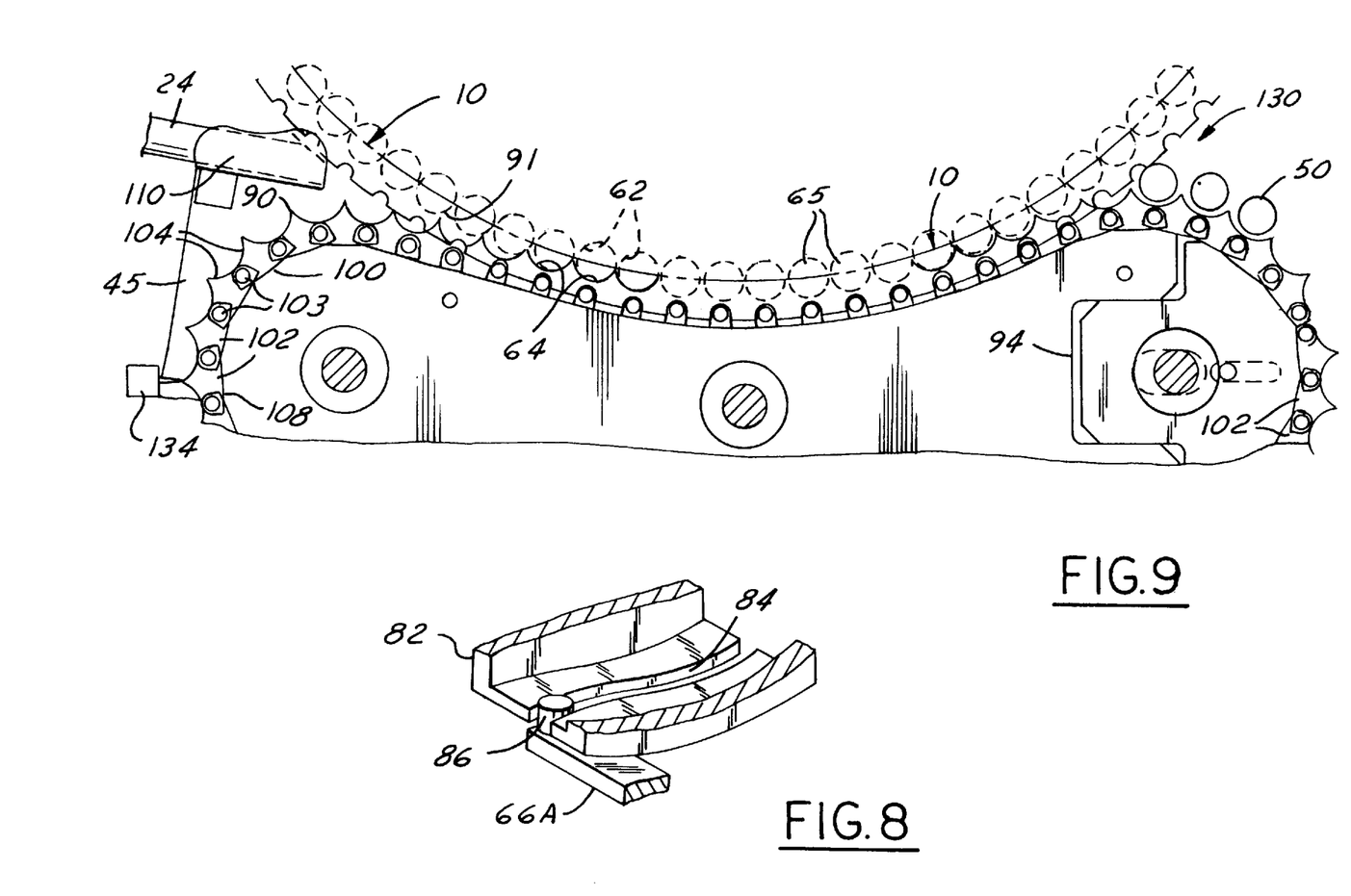
FIGS. 9–12 illustrate the moving chain and grooved die forming members utilized with the gum forming system in accordance with the present invention.

If there is any ice buildup on the chain member 100 due to the cold cooling temperatures utilized, an ice scraper 134 can be provided (see FIGS. 4 and 9).

Also, in accordance with the present invention, the plunger members 66 and 68 are easier to lubricate. Since the temperatures of the cooling mediums needed to effectively operate the present invention are not as low as with known processes, difficulties experienced with the setting or gelling of plunger lubrication (and thus problems with the resulting heat build-up and friction forces) are not as significant. For example, it is unnecessary to heat the oil or other fluid utilized to lubricate the movement of the plunger members. Oil provided to the present mechanism 25 at room temperature is sufficient. With increased and more effective lubrication of the plunger members and other operating mechanisms, the inventive mechanism and system is more durable and should have a longer life.

The plunger members also have a limited path of travel, namely about 5–10 millimeters rather than the 50–60 millimeters as experienced in some prior art mechanisms. This means that friction forces which could build up due to movement of the plungers would be significantly less. This increases the efficiency of the system and minimizes potential breakdowns and stoppage of production for repairs.

With the present invention, it is significant that the gum material has minimal contact with the plunger members and die groove members. The gum material only comes into contact with the plunger members and die grooves within the sector area 88. This minimizes the need for cooling air and minimizes the possibility that the gum material will stick to one of the moving or rotating mechanisms.

The present invention provides a more efficient continuous manufacturing system for liquid or center-filled gum. Pieces of liquid-filled gum material are produced on a faster and more efficient basis than with known processes. In this regard, it is anticipated that the capacity of the present system will be approximately double over known systems and that the system can be utilized without any additional labor expense.

The improved efficiency is due in part to the ease of starting of the process, the reduction in waste of gum material, the fact that jams are fewer and easier to clear, and the fact that the gum material is in less contact with the metal and moving members.

Also with the present invention, the gum material seals around the liquid center in a better manner. This provides a better quality product with fewer leaking pieces of gum. Also, this results in fewer production shut-downs and less maintenance.

While particular embodiments of the invention have been shown and described, numerous variations and alternate embodiments will occur to those skilled in the art. Accordingly, it is intended that the invention be limited only in terms of the appended claims.

What is claimed is:

1. A system for continuously producing pieces of liquid-filled gum material comprising:

a rotating drum mechanism;

a moving continuous chain mechanism; and cooling means;

said drum mechanism having a first plurality of semi-circular die groove members positioned around its periphery, each of said die groove members having a pair of plunger members associated therewith for entering said die groove members and compressing pieces of gum material positioned therein, and cam mechanisms for operating said plunger members;

said chain mechanism having a second plurality of semi-circular die groove members positioned thereon, one of said second plurality of die groove members mating with one of said first plurality of die groove members to form circular die cavities as said drum mechanism rotates adjacent said moving continuous chain mechanism;

said cam members only contacting and activating said plunger members when said plunger members are adjacent said chain mechanism;

said cooling means comprising means for cooling said first and second plurality of die groove members with compressed air in order to minimize sticking of the gum material to said die groove members.

2. The system as set forth in claim 1 further comprising a means for introducing gum material into said first and second plurality of die groove members.

3. The system as set forth in claim 2 wherein said means for introducing gum material includes a plurality of roller members.

4. The system as set forth in claim 1 wherein said cooling means comprises a plurality of tubular members positioned adjacent said first and second plurality of die groove members, wherein cooled air is supplied through said tubular members and directed toward said die groove members.

5. The system as set forth in claim 4 wherein the cooling air from said tubular members is regulated in order to cool said first plurality of die groove members at temperatures below said second plurality of die groove members, wherein said pieces of gum material will adhere less to said first plurality of die groove members than to said second plurality of die groove members.

6. The system as set forth in claim 3 further comprising cooling means for cooling said roller members.

7. The system as set forth in claim 1 further comprising means for assisting in the removal of pieces of formed gum material from said die groove members, said means comprising a stream of air.

8. A method of continuously producing pieces of liquid-filled gum material comprising the steps of:

supplying a rope of liquid filled gum material to a cooling member;

cooling said rope of liquid filled gum material;

introducing said rope of liquid filled gum material into circular cylindrical die cavities formed between a rotating drum mechanism and a moving continuous chain mechanism;

cooling and forming said rope of gum material into separate pieces of sealed gum material in said die cavities, said cooling being supplied by compressed air through tubular members;

compressing said separate pieces of gum material in said cavities into their final product shapes; and ejecting said separate pieces of gum material from said cavities.

9. The method as set forth in claim 8 wherein said step of compressing said separate pieces of gum material includes moving sets of plunger members toward each other in said die cavities.

10. The method as set forth in claim 8 wherein said circular die cavities are formed from semi-circular die groove members on said drum mechanism and semi-circular die groove members on said chain mechanism.

11. The method as set forth in claim 10 wherein said die groove members on said chain mechanism comprise moveable arcuate members which separate to assist in said ejection of said separate pieces of gum material from said cavities.

12. The method as set forth in claim 8 wherein said step of cooling said rope of gum material comprises directing cooling air on said drum mechanism and said chain mechanism.

13. The method as set forth in claim 12 further comprising the step of cooling said drum mechanism to a lower temperature than said chain mechanism.

14. The method as set forth in claim 8 wherein said step of ejecting said separate pieces of gum material includes opening said circular die cavities.

15. The method asset forth in claim 14 wherein said step of ejecting said separate pieces of gum material includes directing a stream of air against said separate pieces of gum material.

16. An apparatus for continuously producing pieces of liquid-filled gum material from a rope of liquid-filled gum material comprising:

a rotating drum mechanism, said drum mechanism comprising a first plurality of die groove members positioned around the periphery of said drum mechanism, a plurality of plunger members positioned adjacent said first plurality of die groove members, and cam members for directing said plunger members into said die groove members for compressing said pieces of gum material;

a continuous chain mechanism, said chain mechanism comprising a second plurality of die groove members; and a plurality of cooling members;

said drum mechanism and said chain mechanism being positioned adjacent one another such that said first plurality of die groove members and said second plurality of die groove members mate to form circular cylindrical die cavities;

said cooling members being positioned adjacent said drum mechanism and said chain mechanism in order to direct cooling air toward said first and second plurality of die groove members.

17. The apparatus as set forth in claim 16 further comprising a cooling member positioned adjacent said drum mechanism and chain mechanism, wherein said rope of gum material is cooled and sized prior to being inserted into said die cavities.

18. The apparatus as set forth in claim 17 wherein said cooling and sizing member comprises a table member with a plurality of roller members positioned thereon and a cooling mechanism for cooling said roller members.

19. The apparatus as set forth in claim 16 wherein said plunger members are provided in pairs, one each on each end of said first plurality of die groove members.

20. The apparatus as set forth in claim 19 wherein said plunger members are biased by a biased member from entering said first plurality of die groove members.

21. The apparatus as set forth in claim 16 wherein said cooling members comprise tubular members positioned around portions of said drum mechanisms and chain mechanisms, said tubular members each having a plurality of small openings for release of the cooling air.

* * * * *